Figure 1:
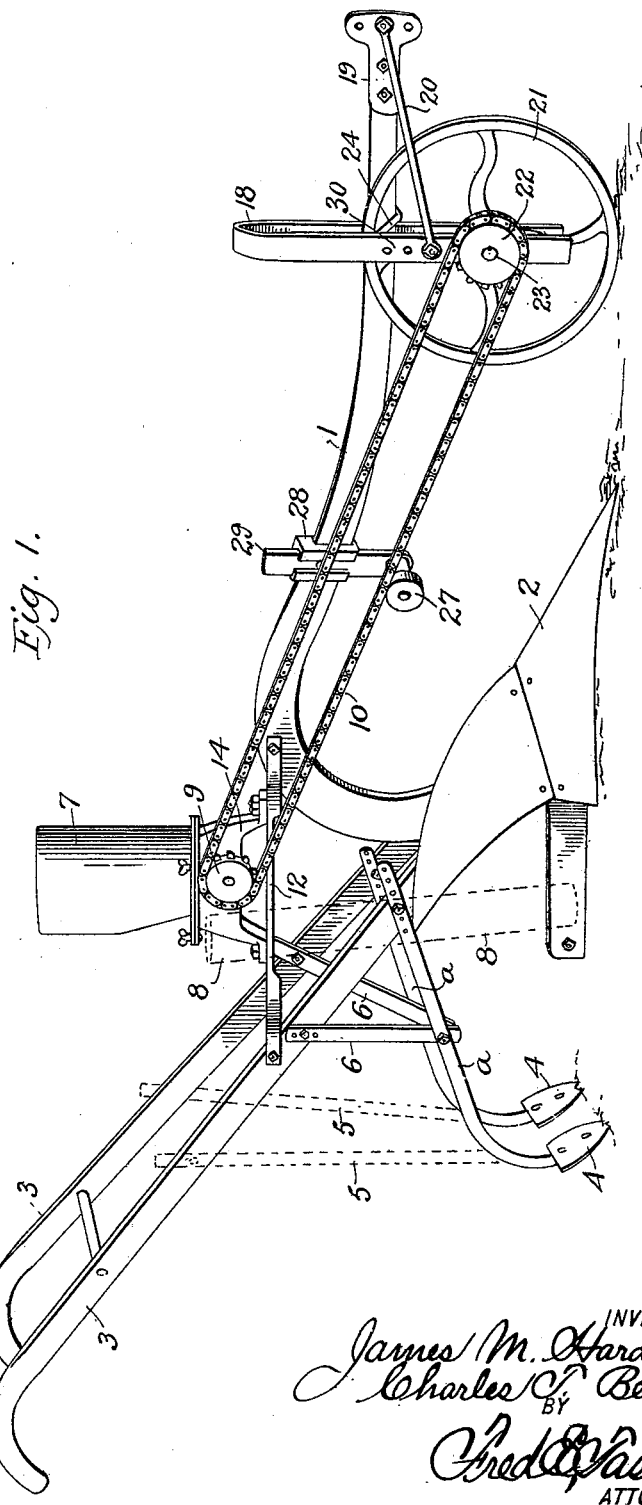

No. 641,696. Patented Jan. 23, 1900.
J. M. HARDEMAN & C. T. BELT.
ATTACHMENT FOR PLOWS AND CULTIVATORS.
(Application filed Apr. 19, 1899.)
(No Model.) 2 Sheets—Sheet 1.

WITNESSES
James F. Duhamel
Robert A Morgan

INVENTORS
James M. Hardeman
Charles T. Belt
BY
Fred E. Tasker
ATTORNEY

THE NORRIS PETERS CO., PHOTO-LITHO., WASHINGTON, D. C.

No. 641,696. Patented Jan. 23, 1900.
J. M. HARDEMAN & C. T. BELT.
ATTACHMENT FOR PLOWS AND CULTIVATORS.
(Application filed Apr. 19, 1899.)
(No Model.) 2 Sheets—Sheet 2.
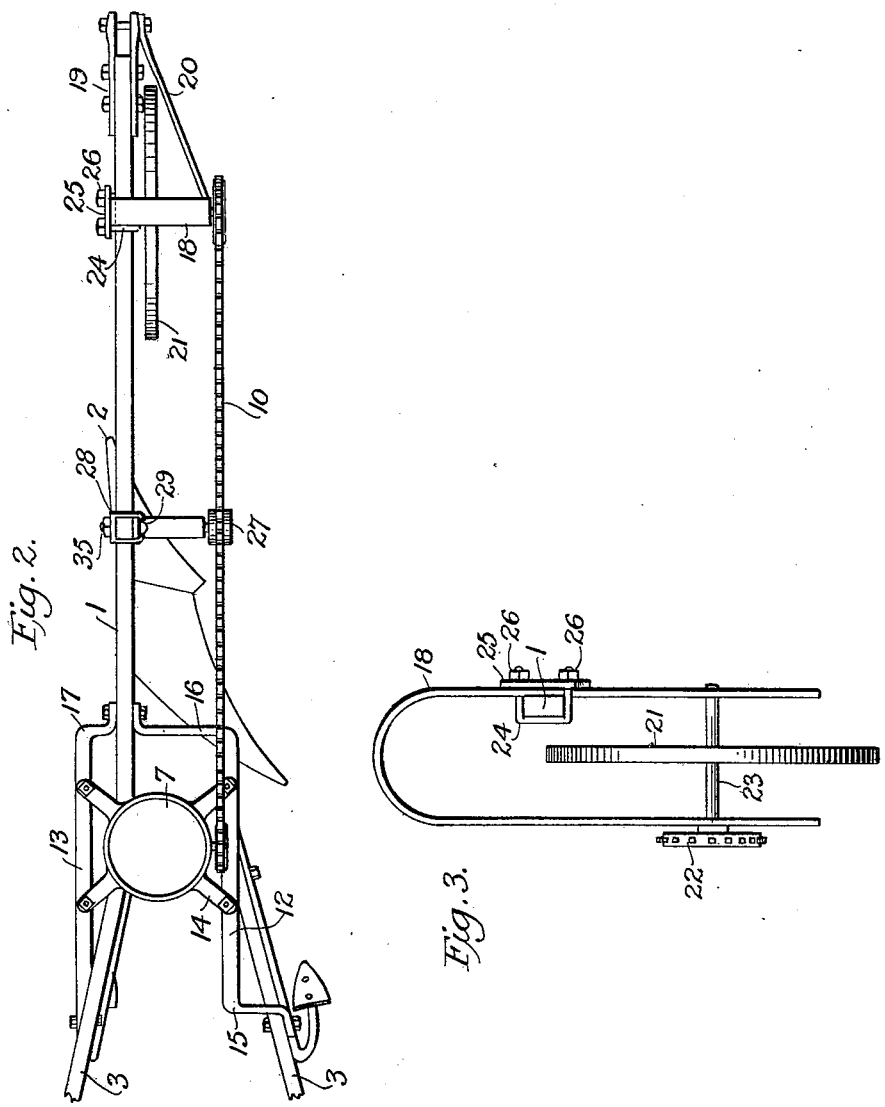
WITNESSES
INVENTORS
James M. Hardeman
Charles T. Belt,
BY
Fred Wasker
ATTORNEY

UNITED STATES PATENT OFFICE.

JAMES MAXWELL HARDEMAN AND CHARLES TILGHMAN BELT, OF TAYLOR, TEXAS.

ATTACHMENT FOR PLOWS AND CULTIVATORS.

SPECIFICATION forming part of Letters Patent No. 641,696, dated January 23, 1900.

Application filed April 19, 1899. Serial No. 713,596. (No model.)

*To all whom it may concern:*

Be it known that we, JAMES MAXWELL HARDEMAN and CHARLES TILGHMAN BELT, citizens of the United States, residing at Taylor, in the county of Williamson and State of Texas, have invented certain new and useful Improvements in Corn and Cotton Planting Attachments for Plows and Cultivators; and we do hereby declare the following to be a full, clear, and exact description of the invention, such as will enable others skilled in the art to which it appertains to make and use the same.

This invention relates to a corn and cotton planting attachment for plows of various kinds, the object being to furnish an attachment that can be applied to any of the many kinds of plows now in common use in order that the ordinary plow-stock may be readily converted into a planter and a planter thus constructed subsequently reconverted into a plow whenever desired; and the invention therefore consists, essentially, in the construction, arrangement, and combination of parts and in certain details and peculiarities thereof, substantially as will be hereinafter described and then more particularly pointed out in the claims.

In the annexed drawings, illustrating our invention, Figure 1 is a side elevation of our improved planter attachment for plows. Fig. 2 is a top plan view of the same. Fig. 3 is a front elevational view showing principally the yoke and appurtenant parts, certain other parts being omitted.

Like numerals and letters of reference designate like parts throughout the different views.

1 designates a plow-beam having at its front end an ordinary clevis 19 and carrying also the turning-plowshare 2.

3 3 denote the handles of the plow.

4 4 denote the two small plows or blades operating as the coverers for the furrows cut by the share in advance of said coverers, the latter being carried by the curved arms *a a*, that are bolted adjustably to the handles 3 3, near the lower ends thereof.

5 5 (shown in dotted lines) are braces fastened to the handles 3 3 and to the arms *a a*, near the coverers 4 4, and 6 6 are also braces bolted adjustably to the handle-bars 3 3 and to the coverer-arms *a a*, all as clearly shown in Fig. 1.

7 denotes the feed-box which contains the corn or other substance used as seed for planting. This feed-box 7 may be of any ordinary and preferred construction, and I do not wish to be restricted to any particular kind. Suitably supported contiguous to the feed-box 7 is a shoe or boot of any ordinary construction (shown in dotted lines at 8) and extending downwardly from the rear of the feed-box for the purpose of conveying the seed into the furrow behind the plow-blade. The sprocket-wheel 9 is carried on a horizontal shaft passing into the feed-box 7, said sprocket-wheel 9 being for the purpose of operating the stirrer in the feed-box and causing the seed to be ejected therefrom. Feed-box 7 has feet 14, four of them being shown in the plan view of Fig. 2, which feet are bolted firmly to the horizontal supporting-bars 12 and 13. The bar 12 is bent at an angle 15 at its rear end, this angular portion being firmly bolted to one of the plow-handles 3, while the forward end of the bar 12 is likewise bent at an angle, the arm 16 of which is bolted to the plow-beam 1. The bends in the bar 12 are in a horizontal plane. Bar 13 is bolted at its rear end to the other plow-handle 3, while its forward end is bent at a short angle 17, which is adjacent to the forward bent end 16 of bar 12 and is likewise secured to the plow-beam at that point. The same bolt that fastens the end 16 to the beam 1 passes through and secures likewise the end 17. Thus it will be seen that bar 13 is likewise bent in a horizontal plane to adapt it for location relative to the plow-handle and the beam, and both bars 12 and 13 are so adjusted as to be parallel and as to effectively sustain the feed-box 7 in a level position.

On the front end of beam 1 is a yoke or collar 18, the same being shown in the front view of Fig. 3. It has an arched top and two vertical parallel legs. One side or leg is clamped to the plow-beam 1 by means of the strap 24, that passes around beam 1, (in an inclined position,) embracing likewise the leg of the yoke and passing through a bar 25, the ends of the strap 24 having the nuts 26 26 thereon, that are screwed tightly against the bar 25. The diagonal brace 20 reaches from the other leg of the yoke 18 to the clevis 19 and assists in sustaining the yoke in position. Brace 20 at the clevis end engages with a rod passing through the clevis. The yoke 18 has both its legs perforated to provide bearings for the horizontal axle 23 of the ground-wheel 21. On one end of the axle 23 is a sprocket-wheel 22, situated outside of the yoke 18. Chain 10 passes around sprocket 22 and also the feed-box sprocket-wheel 9, so that in this way motion is communicated from the ground-wheel to the feed-box sprocket-wheel for the purpose of operating the latter. The clamping device which I have described for fastening the yoke 18 to the beam 1 admits of the yoke being elevated or depressed, carrying the ground-wheel with it, and thus gaging the depth that the plow will cut in the ground. Other perforations, as at 30, are made in the yoke to permit the adjustment of the axle of the ground-wheel in order to increase the depth of the furrow.

27 indicates an idle wheel carried upon the end of a horizontal stud projecting from a vertical slide 29, that is embraced by and slides adjustably within an angle-plate 28, said slide 29 being secured in any desired position by means of the bolt 35. There may be more than one idle wheel, if desired. Its function is to control the tension of the sprocket-chain 10. It will be observed that it is in contact with said chain and that its pressure against it may be increased or diminished by adjusting the slide 29.

Numerous changes may be made in the exact construction and combination of the several parts without exceeding the true intent and scope of the ensuing claims, which are intended to mark the boundaries of our present invention.

We also point out as an advantage of our invention that by its use the man and team operating the ordinary planter are dispensed with, since our plow, with its attachments, opens the furrow, deposits the seed, and covers them in the furrow and can be used with one or two horses, thus dispensing with one or two horses in the ordinary method of planting and, in any case, with one hand.

Having thus described our invention, what we claim as new, and desire to secure by Letters Patent, is—

1. In a corn and cotton planting attachment for plows, the combination with a plow having a share and coverers at the rear of said share, said coverers being detachably secured to the plow-handles, of a feed-box mounted upon horizontal bars that are secured at their rear ends to the plow-handles, and at their front ends to the plow-beam, a yoke adjustably secured to the beam near its front end and carrying a ground-wheel, a chain for communicating motion from the ground-wheel to the feed-box, and an adjustable idle wheel journaled in a boxing or angle-plate on the plow-beam for regulating the tension of the chain, substantially as described.

2. The combination with a plow having a beam, a plowshare, detachable coverers, and handles, of a feed-box having a boot, and an operating sprocket-wheel, a yoke adjustably secured on the beam near its front end, a ground-wheel journaled in said yoke and having a sprocket secured upon its shaft, a belt or chain connecting the ground-wheel sprocket and the feed-box sprocket-wheel, and an adjustable idler device journaled on the plow-beam for regulating the tension of said belt or chain, substantially as described.

In testimony whereof we affix our signatures in presence of two witnesses.

JAMES MAXWELL HARDEMAN.
CHARLES TILGHMAN BELT.

Witnesses:
R. B. LAYTON,
P. O. WILLSON.